US012300433B2

(12) United States Patent
Brambilla et al.

(10) Patent No.: US 12,300,433 B2
(45) Date of Patent: *May 13, 2025

(54) NANOSTRUCTURED ELECTRODE FOR ENERGY STORAGE DEVICE

(71) Applicant: FASTCAP ULTRACAPACITORS LLC, Woburn, MA (US)

(72) Inventors: Nicolo Michele Brambilla, Boston, MA (US); Fabrizio Martini, Boston, MA (US)

(73) Assignee: FASTCAP ULTRACAPACITORS LLC, Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,573

(22) Filed: Feb. 29, 2024

(65) Prior Publication Data

US 2024/0249891 A1   Jul. 25, 2024

Related U.S. Application Data

(60) Continuation of application No. 18/139,008, filed on Apr. 25, 2023, now Pat. No. 11,942,271, which is a (Continued)

(51) Int. Cl.
*H01G 11/36* (2013.01)
*B82Y 30/00* (2011.01)
(Continued)

(52) U.S. Cl.
CPC .............. *H01G 11/36* (2013.01); *B82Y 30/00* (2013.01); *C01B 32/158* (2017.08); *H01G 11/24* (2013.01);
(Continued)

(58) Field of Classification Search
CPC ........ H01G 11/36; H01G 11/24; H01G 11/26; H01G 11/28; H01G 11/48; H01G 11/46;
(Continued)

(56) References Cited

U.S. PATENT DOCUMENTS 3,982,182 A    9/1976  Hogg
4,349,910 A    9/1982  Belz
(Continued)

OTHER PUBLICATIONS

Office Action mailed Dec. 11, 2013 for U.S. Appl. No. 12/928,897.
(Continued)

*Primary Examiner* — Michael P McFadden

(57) ABSTRACT

Disclosed herein is electrode comprising a current collector comprising a conductor layer having at least a first surface; and elongated metal carbide nanostructures extending from the first surface; and a carbonaceous energy storage media disposed on the first surface and in contact with the elongated metal carbide nanostructures. Disclosed herein too is an ultracapacitor comprising at least one electrode comprising a current collector comprising a conductor layer having at least a first surface; and elongated metal carbide nanostructures extending from the first surface; and a carbonaceous energy storage media disposed on the first surface and in contact with the elongated metal carbide nanostructures.

17 Claims, 11 Drawing Sheets

Related U.S. Application Data division of application No. 17/141,728, filed on Jan. 5, 2021, now Pat. No. 11,664,173, which is a division of application No. 16/591,901, filed on Oct. 3, 2019, now Pat. No. 10,886,074, which is a continuation of application No. 15/482,765, filed on Apr. 8, 2017, now abandoned, which is a continuation of application No. PCT/US2015/055032, filed on Oct. 9, 2015.

(60) Provisional application No. 62/061,947, filed on Oct. 9, 2014.

(51) Int. Cl.

| | | |
|---|---|---|
| *C01B 32/158* | (2017.01) | |
| *H01G 11/24* | (2013.01) | |
| *H01G 11/26* | (2013.01) | |
| *H01G 11/28* | (2013.01) | |
| *H01G 11/46* | (2013.01) | |
| *H01G 11/48* | (2013.01) | |
| *H01G 11/70* | (2013.01) | |
| *H01G 11/86* | (2013.01) | |

(52) U.S. Cl.
CPC .......... *H01G 11/26* (2013.01); *H01G 11/28* (2013.01); *H01G 11/48* (2013.01); *H01G 11/70* (2013.01); *H01G 11/86* (2013.01); *H01G 11/46* (2013.01); *Y02E 60/13* (2013.01)

(58) Field of Classification Search
CPC ...... H01G 11/70; H01G 11/86; C01B 32/158; B82Y 30/00; Y02E 60/13
See application file for complete search history.

(56) References Cited

U.S. PATENT DOCUMENTS

| | | |
|---|---|---|
| 4,408,259 A | 10/1983 | Muranaka et al. |
| 4,934,366 A | 6/1990 | Truex et al. |
| 5,426,561 A | 6/1995 | Yen et al. |
| 5,440,447 A | 8/1995 | Shipman et al. |
| 5,441,827 A | 8/1995 | Gratzel et al. |
| 5,476,709 A | 12/1995 | Inoue et al. |
| 5,711,988 A | 1/1998 | Tsai et al. |
| 5,905,629 A | 5/1999 | Alford |
| 5,923,619 A | 7/1999 | Knapen et al. |
| 6,059,847 A | 5/2000 | Farahmandi et al. |
| 6,060,424 A | 5/2000 | Alford |
| 6,193,779 B1 | 2/2001 | Reichert et al. |
| 6,205,016 B1 | 3/2001 | Niu |
| 6,232,706 B1 | 5/2001 | Dai et al. |
| 6,257,332 B1 | 7/2001 | Vidrine et al. |
| 6,304,427 B1 | 10/2001 | Reed et al. |
| 6,318,457 B1 | 11/2001 | Den Boer et al. |
| 6,346,187 B1 | 2/2002 | Tran et al. |
| 6,350,488 B1 | 2/2002 | Lee et al. |
| 6,388,423 B1 | 5/2002 | Schilleci, Jr. |
| 6,413,285 B1 | 7/2002 | Chu et al. |
| 6,444,326 B1 | 9/2002 | Smith |
| 6,454,816 B1 | 9/2002 | Lee et al. |
| 6,491,848 B1 | 12/2002 | Sato et al. |
| 6,511,760 B1 | 1/2003 | Barone et al. |
| 6,514,113 B1 | 2/2003 | Lee et al. |
| 6,565,701 B1 | 5/2003 | Jerabek et al. |
| 6,665,169 B2 | 12/2003 | Tennent et al. |
| 6,764,874 B1 | 7/2004 | Zhang et al. |
| 6,843,119 B2 | 1/2005 | Patey et al. |
| 6,872,681 B2 | 3/2005 | Niu et al. |
| 6,906,911 B2 | 6/2005 | Ikeda et al. |
| 6,914,341 B1 | 7/2005 | McIntyre |
| 6,924,059 B1 | 8/2005 | Kawakami et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,168,487 B2 | 1/2007 | Salamitou et al. |
| 7,201,627 B2 | 4/2007 | Ohnuma |
| 7,327,556 B2 | 2/2008 | Ro et al. |
| 7,335,395 B2 | 2/2008 | Ward et al. |
| 7,381,367 B1 | 6/2008 | Baker et al. |
| 7,468,679 B2 | 12/2008 | Feluch |
| 7,493,962 B2 | 2/2009 | Sheffield |
| 7,511,941 B1 | 3/2009 | Gallay et al. |
| 7,699,102 B2 | 4/2010 | Storm et al. |
| 7,713,658 B2 | 5/2010 | Mizuta et al. |
| 7,767,114 B2 | 8/2010 | Gordon et al. |
| 7,785,558 B2 | 8/2010 | Hikata |
| 7,897,209 B2 | 3/2011 | Shibuya et al. |
| 7,914,927 B2 | 3/2011 | Mizuta et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,119,032 B2 | 2/2012 | Gordon et al. |
| 8,168,331 B2 | 5/2012 | Best et al. |
| 8,450,012 B2 * | 5/2013 | Cui .................. H01M 10/0525 429/220 |
| 8,531,818 B2 | 9/2013 | Hashimoto et al. |
| 8,709,374 B2 | 4/2014 | Cooper et al. |
| 8,760,851 B2 | 6/2014 | Signorelli et al. |
| 8,822,057 B2 | 9/2014 | Sinsabaugh et al. |
| 8,932,750 B2 | 1/2015 | Cooley et al. |
| 9,001,495 B2 | 4/2015 | Martini et al. |
| 9,013,144 B2 | 4/2015 | Cooley |
| 9,017,634 B2 | 4/2015 | Brambilla et al. |
| 9,206,672 B2 | 12/2015 | Cooley et al. |
| 9,209,434 B2 | 12/2015 | Epstein |
| 9,214,709 B2 | 12/2015 | Cooley et al. |
| 9,218,917 B2 | 12/2015 | Brambilla et al. |
| 9,257,704 B2 | 2/2016 | Balu et al. |
| 9,515,499 B2 | 12/2016 | Signorelli et al. |
| 9,558,894 B2 | 1/2017 | Signorelli et al. |
| 9,683,441 B2 | 6/2017 | Signorelli et al. |
| 9,954,382 B2 | 4/2018 | Cooley et al. |
| 11,942,271 B2 * | 3/2024 | Brambilla .............. H01G 11/24 |
| 2001/0006108 A1 | 7/2001 | Brett |
| 2002/0043369 A1 | 4/2002 | Vinegar et al. |
| 2002/0159943 A1 | 10/2002 | Smalley et al. |
| 2002/0177018 A1 | 11/2002 | Fuglevand |
| 2003/0003359 A1 | 1/2003 | Banno et al. |
| 2003/0027038 A1 | 2/2003 | Tsukamoto et al. |
| 2003/0030969 A1 | 2/2003 | Farahmandi |
| 2003/0081372 A1 | 5/2003 | Nakazawa et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2005/0152096 A1 | 7/2005 | Farahmandi et al. |
| 2005/0208207 A1 | 9/2005 | Hinoki et al. |
| 2005/0230270 A1 | 10/2005 | Ren et al. |
| 2005/0231893 A1 | 10/2005 | Harvey |
| 2005/0234177 A1 | 10/2005 | Zaghib et al. |
| 2005/0238810 A1 | 10/2005 | Scaringe et al. |
| 2005/0250052 A1 | 11/2005 | Nguyen |
| 2006/0019168 A1 | 1/2006 | Li et al. |
| 2006/0115722 A1 | 6/2006 | Kim |
| 2006/0191681 A1 | 8/2006 | Storm et al. |
| 2006/0194102 A1 | 8/2006 | Keshishian et al. |
| 2006/0241236 A1 | 10/2006 | Kuznetsov et al. |
| 2006/0256506 A1 | 11/2006 | Konuma et al. |
| 2006/0279906 A1 | 12/2006 | Stemen et al. |
| 2007/0015336 A1 | 1/2007 | Farahmandi et al. |
| 2007/0076349 A1 | 4/2007 | Dementiev et al. |
| 2007/0097598 A1 | 5/2007 | Siggel |
| 2007/0146965 A1 | 6/2007 | Mitchell et al. |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0292746 A1 | 12/2007 | Sloop |
| 2008/0013224 A1 | 1/2008 | Kim et al. |
| 2008/0068801 A1 | 3/2008 | Wilk |
| 2008/0083626 A1 | 4/2008 | Kubo et al. |
| 2008/0090183 A1 | 4/2008 | Zhu et al. |
| 2008/0094777 A1 | 4/2008 | Itahashi et al. |

(56) References Cited

U.S. PATENT DOCUMENTS

| | | |
|---|---|---|
| 2008/0192407 A1 | 8/2008 | Lu et al. |
| 2008/0218945 A1 | 9/2008 | Ro et al. |
| 2008/0304207 A1 | 12/2008 | Brandon et al. |
| 2008/0316678 A1 | 12/2008 | Ehrenberg et al. |
| 2008/0317660 A1 | 12/2008 | Pan et al. |
| 2009/0011330 A1 | 1/2009 | Onodera et al. |
| 2009/0021890 A1 | 1/2009 | Bourcier et al. |
| 2009/0194314 A1 | 8/2009 | Varkey et al. |
| 2009/0246625 A1 | 10/2009 | Lu |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0294753 A1 | 12/2009 | Hauge et al. |
| 2009/0303658 A1 | 12/2009 | Hiroyuki et al. |
| 2010/0046142 A1 | 2/2010 | Aitchison et al. |
| 2010/0062229 A1 | 3/2010 | Hata et al. |
| 2010/0119934 A1 | 5/2010 | Ushio et al. |
| 2010/0134955 A1 | 6/2010 | O'Connor et al. |
| 2010/0178543 A1 | 7/2010 | Gruner et al. |
| 2010/0178564 A1 | 7/2010 | Asari et al. |
| 2010/0190639 A1* | 7/2010 | Worsley .......... H01B 1/08 502/185 |
| 2010/0195269 A1 | 8/2010 | Kim et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2010/0285358 A1 | 11/2010 | Cui et al. |
| 2011/0013344 A1 | 1/2011 | Remizov et al. |
| 2011/0027537 A1 | 2/2011 | Inoue et al. |
| 2011/0049901 A1 | 3/2011 | Tinnen et al. |
| 2011/0080689 A1 | 4/2011 | Bielawski et al. |
| 2011/0085285 A1 | 4/2011 | Zednicek et al. |
| 2011/0091767 A1 | 4/2011 | Hojo et al. |
| 2011/0102002 A1 | 5/2011 | Riehl et al. |
| 2011/0133284 A1 | 6/2011 | Mitra et al. |
| 2011/0141661 A1 | 6/2011 | Muthu et al. |
| 2011/0143197 A1 | 6/2011 | Ohtsuka et al. |
| 2011/0150736 A1 | 6/2011 | Hagiwara et al. |
| 2011/0151317 A1 | 6/2011 | Giroud et al. |
| 2011/0170236 A1 | 7/2011 | Young |
| 2011/0170237 A1 | 7/2011 | Brandon et al. |
| 2011/0171371 A1 | 7/2011 | Li et al. |
| 2011/0183206 A1 | 7/2011 | Davis et al. |
| 2011/0220191 A1* | 9/2011 | Flood .......... H01L 31/0296 977/948 |
| 2011/0255212 A1 | 10/2011 | Liu et al. |
| 2011/0262772 A1 | 10/2011 | Hauge et al. |
| 2011/0281156 A1 | 11/2011 | Boren et al. |
| 2011/0293850 A1 | 12/2011 | Yi et al. |
| 2012/0021291 A1 | 1/2012 | Ji et al. |
| 2012/0077006 A1 | 3/2012 | Worsley et al. |
| 2012/0094181 A1 | 4/2012 | Kim et al. |
| 2012/0099244 A1 | 4/2012 | Lee et al. |
| 2012/0122020 A1 | 5/2012 | Hata et al. |
| 2012/0154979 A1 | 6/2012 | Signorelli et al. |
| 2012/0231270 A1 | 9/2012 | Dhinojwala et al. |
| 2012/0251432 A1 | 10/2012 | Cooper et al. |
| 2012/0257326 A1 | 10/2012 | Gadkaree et al. |
| 2012/0313586 A1 | 12/2012 | Signorelli et al. |
| 2012/0313591 A1* | 12/2012 | Brambilla .......... H01G 11/36 204/192.15 |
| 2013/0004657 A1 | 1/2013 | Xu et al. |
| 2013/0005941 A1 | 1/2013 | Kondou et al. |
| 2013/0026978 A1 | 1/2013 | Cooley et al. |
| 2013/0029215 A1 | 1/2013 | Signorelli et al. |
| 2013/0044130 A1 | 2/2013 | Geisner et al. |
| 2013/0044405 A1* | 2/2013 | Brambilla .......... H01G 11/68 29/25.03 |
| 2013/0045157 A1 | 2/2013 | Brambilla et al. |
| 2013/0141840 A1 | 6/2013 | Cooley et al. |
| 2013/0177812 A1 | 7/2013 | Han et al. |
| 2013/0189580 A1 | 7/2013 | Dai et al. |
| 2014/0016246 A1 | 1/2014 | Gadkaree et al. |
| 2014/0042988 A1 | 2/2014 | Kuttipillai |
| 2014/0057164 A1 | 2/2014 | Brambilla et al. |
| 2014/0065447 A1 | 3/2014 | Liu et al. |
| 2014/0104754 A1 | 4/2014 | Lipka et al. |
| 2014/0186550 A1 | 7/2014 | Cooper et al. |
| 2014/0186716 A1* | 7/2014 | Wu .......... H01M 10/0525 429/231.95 |
| 2014/0265565 A1 | 9/2014 | Cooley et al. |
| 2014/0265580 A1 | 9/2014 | Cooley et al. |
| 2014/0299359 A1 | 10/2014 | Mittal et al. |
| 2014/0363568 A1 | 12/2014 | Suematsu et al. |
| 2015/0002987 A1 | 1/2015 | Signorelli et al. |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2016/0012979 A1 | 1/2016 | Zheng |
| 2016/0104891 A1 | 4/2016 | Holme |
| 2017/0316889 A1 | 11/2017 | Martini et al. |
| 2018/0068803 A1 | 3/2018 | Brambilla et al. |
| 2018/0135408 A1 | 5/2018 | Cooley et al. |
| 2018/0171777 A1 | 6/2018 | Cooley et al. |
| 2018/0204689 A1 | 7/2018 | Brambilla |
| 2018/0211794 A1 | 7/2018 | Brambilla |
| 2020/0035422 A1 | 1/2020 | Brambilla et al. |

OTHER PUBLICATIONS

Office Action mailed Jul. 16, 2014 for U.S. Appl. No. 12/928,897.
Office Action mailed Jun. 18, 2014 for U.S. Appl. No. 13/588,452.
Office Action mailed May 29, 2014 for U.S. Appl. No. 13/560,628.
Office Action mailed Oct. 15, 2014 for U.S. Appl. No. 13/587,037.

* cited by examiner

Capacitance of 1 layer of CNTs on Al$_4$C$_3$ on 50 μm aluminum foil.

Phase of 1 layer of CNTs on $Al_4C_3$ on 50 μm aluminum foil.

Cyclic voltametry of 1 layer of CNTs on $Al_4C_3$ on 50 μm aluminum foil.

NANOSTRUCTURED ELECTRODE FOR ENERGY STORAGE DEVICE

CROSS REFERENCE TO RELATED APPLICATIONS

The present application is a Continuation of U.S. patent application Ser. No. 18/139,008, filed Apr. 25, 2023, now U.S. Pat. No. 11,942,271, granted on Mar. 26, 2024, which is a Divisional of U.S. patent application Ser. No. 17/141,728, filed Jan. 5, 2021, now U.S. Pat. No. 11,664,173, granted on May 30, 2023, which is a Divisional of U.S. patent application Ser. No. 16/591,901 filed Oct. 3, 2019, now U.S. Pat. No. 10,886,074, granted on Jan. 5, 2021, which is a Continuation of U.S. patent application Ser. No. 15/482,765 filed Apr. 8, 2017, abandoned Dec. 27, 2019, which is a continuation of International Patent Application No. PCT/US2015/055032, filed Oct. 9, 2015, which claims priority to U.S. Provisional Application 62/061,947 filed Oct. 9, 2014, the entire contents of which are incorporated herein by reference.

STATEMENT OF FEDERALLY SPONSORED RESEARCH

This invention was made with government support under grant DE-AR0000035/0001 awarded by the Unites States Department of Energy (ARPA-E) and/or DE-DE-EE0005503/001 awarded by the Unites States Department of Energy (EERE). The United States government has certain rights in the invention.

TECHNICAL FIELD

The present invention relates to producing electrodes comprising carbon nanotube aggregates for use in energy storage devices, including methods for producing such electrodes and energy storage devices that utilize such electrodes.

BACKGROUND

Carbon nanotubes (CNTs) are carbon structures that exhibit a variety of properties. Many of the properties suggest opportunities for improvements in a variety of technology areas. These technology areas include electronic device materials, optical materials as well as conducting and other materials. For example, CNTs are proving to be useful for energy storage in capacitors.

However, effective transfer of the CNTs onto a current collector for a capacitor has proven to be challenging. Further, techniques have not enabled transfer of CNTs in a form that will provide for desired performance capabilities, e.g., power density, energy density, maximum voltage rating, equivalent series resistance (ESR), frequency response, cycle efficiency, and stability/For example, a bonding layer is typically used to cause CNTs to adhere to the surface of a current collector. The bonding layer typically affects the performance of the resulting capacitor in a number of ways, including increasing the ESR and decreasing the energy density and power density.

Thus, what are needed are methods and apparatus for production of a high performance electrode based on carbon nanotubes. Preferably, the methods and apparatus are simple to perform and thus offer reduced cost of manufacture, as well as an improved rate of production.

BRIEF SUMMARY OF CERTAIN EMBODIMENTS

In one embodiment, an electrode is provided. The electrode includes a current collector comprising aluminum with an aluminum carbide layer on at least one surface, on which at least one layer of CNTs is disposed. The electrode may comprise vertically-aligned, horizontally-aligned, or non-aligned (e.g., tangled or clustered) CNTs. The electrode may comprise compressed CNTs. The electrode may comprise single-walled, double-walled, or multiwalled CNTs. The electrode may comprise multiple layers of CNTs.

In another embodiment, a method for fabricating an electrode is provided. The method comprises selecting a current collector with a layer of aluminum carbide on at least one surface of the current collector and disposing CNTs onto the aluminum carbide layer. Disposing CNTs onto the aluminum carbide layer may comprise disposing vertically-aligned, horizontally-aligned, or nonaligned (e.g., tangled or clustered) CNTs. The resulting electrode may comprise vertically-aligned, horizontally-aligned, or nonaligned (e.g., tangled or clustered) CNTs. Disposing CNTs onto the aluminum carbide layer may comprise disposing compressed CNTs and/or compressing the CNTs after they have been disposed on the aluminum carbide layer. The resulting electrode may comprise compressed CNTs. Disposing CNTs onto the aluminum carbide layer may comprise disposing single-walled, double-walled, or multiwalled CNTs. The resulting electrode may comprise single-walled, double-walled, or multiwalled CNTs. The method may further comprise disposing additional layers of CNTs onto the layer of CNT disposed onto the aluminum carbide layer, which additional layers of CNTs may be vertically-aligned, horizontally-aligned, or nonaligned (e.g., tangled or clustered) CNTs; compressed CNTs; or single-walled, double-walled, or multiwalled CNTs.

Disposing CNTs onto the aluminum carbide layer may comprise any variety of methods for creating a layer of CNTs on a surface, including transferring CNTs from a solution, transferring CNTs using any variety of dry transfer methods, growing CNTs directly on the aluminum carbide layer, and any combination of these methods. In certain embodiments, a layer of CNTs is grown directly on an aluminum current collector having an aluminum carbide layer on at least one surface. The layer may comprise single-walled, double-walled, or multiwalled CNTs. In certain embodiments, a layer of CNTs is transferred to the current collector using any variety of dry transfer methods, such as transfer tape, compression. In certain embodiments, a dry transfer method is used to add additional layers of CNTs onto a layer of CNTs that has been disposed onto an aluminum carbide layer of the current collector. In certain embodiments, a layer of CNTs is transferred to the current collector using any variety of wet, solvent-based transfer methods, including precipitation, evaporation, spray-drying, In a further embodiment, an ultracapacitor is provided. The ultracapacitor includes at least one electrode of the type described herein.

The ultracapacitor may further comprise an electrolyte with certain desired properties in terms of the electrical performance and compatibility with the other materials of the ultracapacitor, e.g., the electrode or separator. In certain embodiments, the electrolyte is a solution comprising at least one inorganic or organic salt, such as an ionic liquid, and optionally further comprising at least one solvent. In certain embodiments, the electrolyte is a gel comprising at least one ionic liquid and at least one gelling agent, and optionally comprising other additives such as solvents, salts, and surfactants. In certain embodiments, the electrolyte is a solid polymer electrolyte comprising at least one inorganic or organic salt, such as an ionic liquid, and at least one polymeric material, such as a fluoropolymer (e.g., polytetrafluoroethylene (PTFE), polyether ether ketone (PEEK), polyvinylidene difluoride (PVDF), or co-polymers thereof) and optionally comprising other additives such as solvents, salts, and surfactants. In a particular embodiment, the electrolyte is substantially free of moisture and other contaminants that may adversely affect the performance of the ultracapacitor.

The ultracapacitor may further comprise a separator to provide electrical separation between a positive electrode and a negative electrode of the ultracapacitor, which separator has certain desired properties in terms of the electrical performance and compatibility with the other materials of the ultracapacitor, e.g., the electrode or electrolyte. In certain embodiments, the separator comprises a material selected from the group consisting of polyamide, PTFE, PEEK, PVDF, aluminum oxide ($Al_2O_3$), fiberglass, fiberglass reinforced plastic, or any combination thereof. In a particular embodiment, the separator is substantially free of moisture. In another particular embodiment, the separator is substantially hydrophobic.

In yet another embodiment, a method for fabricating an ultracapacitor is provided. The method includes selecting an electrode, which comprises a current collector with an aluminum carbide layer on at least one surface and CNTs disposed on the aluminum carbide layer, and including the electrode in an ultracapacitor. The method may further comprise selecting an electrolyte with certain desired properties in terms of the electrical performance and compatibility with the other materials of the ultracapacitor, e.g., the electrode or separator. The method may further comprise selecting a separator with certain desired properties in terms of the electrical performance and compatibility with the other materials of the ultracapacitor, e.g., the electrode or electrolyte.

BRIEF DESCRIPTION OF DRAWINGS

The foregoing and other features and advantages of the disclosure are apparent from the following detailed description taken in conjunction with the accompanying drawings in which.

DETAILED DESCRIPTION OF CERTAIN EMBODIMENTS

Disclosed are methods and apparatus for providing a high performance electrode for an energy storage device, e.g., an ultracapacitor, where the electrode includes an aluminum current collector with a layer of aluminum carbide on at least one surface and carbon nanotubes (CNTs) disposed on the aluminum carbide layer. Advantageously, the electrode may be fabricated from mass-produced materials, e.g., aluminum carbide coated current collectors and CNTs. Energy storage devices, such as ultracapacitors, that incorporate the presently disclosed electrode exhibit, among other things, higher performance than previously achievable, in terms of at least one of gravimetric power density (power as a function of weight), volumetric power density (power as a function of volume), gravimetric energy density (energy as a function of weight), volumetric energy density (energy as a function of volume), equivalent series resistance (ESR), frequency response, and maximum voltage.

In order to provide some context for the teachings herein, reference is first made to U.S. Pat. No. 7,897,209, entitled "Apparatus and Method for Producing Aligned Carbon Nanotube Aggregate." This patent is incorporated herein by reference, in its entirety.

The foregoing patent (the "'209 patent") teaches a process for producing aligned carbon nanotube aggregate." Accordingly, the teachings of the '209 patent, which are but one example of techniques for producing aligned carbon nanotube aggregate, may be used to produce carbon nanotube aggregate (CNT) referred to herein.

One example of a device incorporating an electrode as provided herein is provided in U.S. patent Application Publication No. 2007-0258192, entitled "Engineered Structure for Charge Storage and Method of Making," also incorporated herein by reference, in its entirety. In general, methods and apparatus disclosed herein may be used to enhance an energy storage system, such as the embodiments disclosed in this publication. One embodiment of such energy storage is referred to as an "ultracapacitor." However, it should be recognized that the teachings herein may be applicable to other embodiments of energy storage and are therefore not limited to practice with an ultracapacitor.

Figure 1:
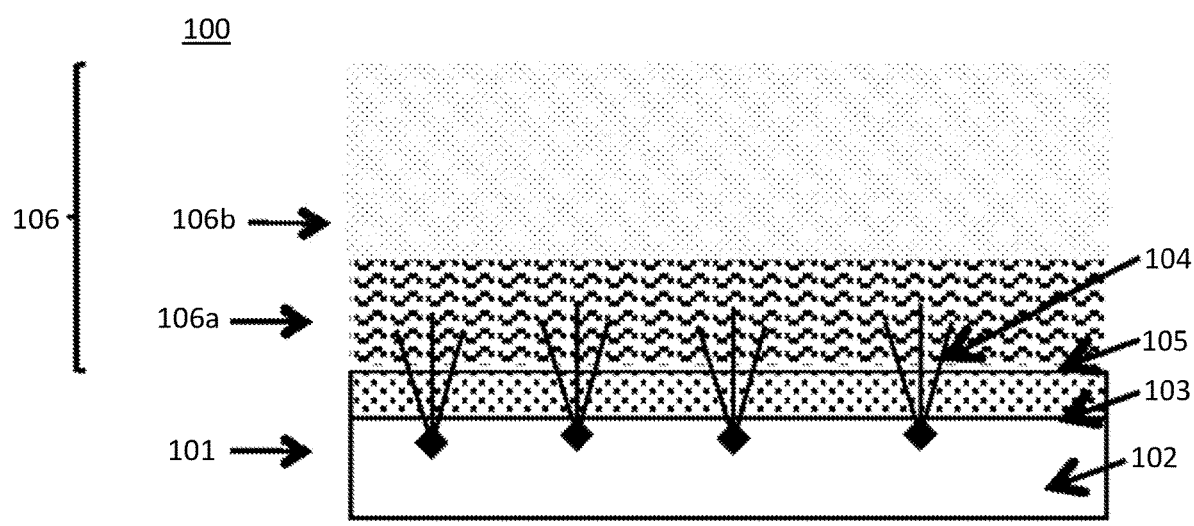
FIG. 1 is a block diagram depicting an embodiment of an electrode of the present disclosure.

Electrodes for energy storage devices are disclosed herein. Referring to FIG. 1 in some embodiments, an electrode 100 includes a current collector 101 comprising a conductor layer 102 having at least a first surface 103. The conductor layer may be made of any suitable electrically conductive material, e.g., a metal such as aluminum. In some embodiments, the conductor layer may be rigid (e.g., a metal plate), or flexible (e.g., a metal foil).

In some embodiments, elongated metal carbide nanostructures 104 extend from the first surface 103. The structure of the metal carbide material on the surface 103 of the current collector 101 may vary. The structure of the metal carbide typically material depends on the method by which carbon is deposited on the current collector 101. The structure may depend, among other factors, on the type of metal or metal alloy used as a current collector and the source of carbon used to form the metal carbide layer.

One advantageous metal carbide structure is metal carbide "whiskers," as shown. These whiskers are thin elongated structures (e.g., nanorods) that extend generally away from the surface 103 of the current collector 101. The whiskers may have a radial thickness of less than 100 nm, 50 nm, 25, nm, 10 nm, or less, e.g., in the range of 1 nm to 100 nm or any subrange thereof. The whiskers may have a longitudinal lengths that is several to many times the radial thickness, e.g., greater than 200 nm, 300, nm, 400, nm, 500 nm, 1 µm, 5 µm, 10 µm, or more, e.g., in the range of 100 nm to 100 µm or any subrange thereof.

PCT Publication No. WO WO/2000/044965, dated Aug. 3, 2000 and titled "Manufacture of transition metal carbide and carbonitride whiskers with low amounts of oxygen and residual oxide phases," the entire disclosure of which is incorporated by reference, discloses transition metal carbide "whiskers" useful in certain embodiments of the present disclosure. Metal carbide whiskers of the present disclosure may comprise any metal, e.g., an alkali metal of Group 1, an alkaline earth metal of Group 2, a transition metal of Groups 3-12, or a post-transition metal of Group 13-15, provided the carbide is relatively stable and demonstrates acceptable electrical performance under the conditions in which an electrode comprising the carbide would be used. For example, metal carbide whiskers of the present disclosure may comprise magnesium carbide, aluminum carbide, titanium carbide, zirconium carbide, hafnium carbide, vanadium carbide, niobium carbide, tantalum carbide, chromium carbide, molybdenum carbide, tungsten carbide, or any mixed metal carbide (e.g., titanium-tantalum carbide, aluminum-titanium carbide, or metal-silicon carbide, such as nickel-silicon carbide). An exemplary current collector is the current collector available from Toyo Aluminum K.K. under the trade name TOYAL-CARBO®.

The metal carbide whiskers may be formed on a variety of metal substrates, which typically include the same metal as the metal carbide whiskers and may include additional metal-containing layers, e.g., layers containing other metals, metal alloys, or metal oxides or hydroxides. For example, as shown in FIG. 1, the current collector 101 includes a cover layer 105 (e.g., a metal oxide layer, such as an aluminum oxide layer) disposed on the first surface 103. In some embodiments this cover layer 105 may be thin, (e.g., 1 µm or less) such that and the elongated metal carbide nanostructures 104 extend through the cover layer 105.

In some embodiments, a carbonaceous energy storage media 106 is disposed on the first surface 103 or the current collector and in contact with the elongated metal carbide nanostructures 104. The interface between the nanostructures 104 and the media 106.

The media 106 may include one or more forms of carbon including activated carbon or nanoform carbon. The language "nanoform carbon" is used herein to describe the general class of allotropes of carbon, which, for example, include but are not limited to nanotubes (single or multi-walled, aligned or unaligned) nanohorns, nano-onions, carbon black, fullerene, graphene, and oxidized graphene. In certain embodiments of the invention the nanoform carbon is a nanotube, e.g., aligned carbon nanotubes.

In some embodiments, the media 106 may be monolithic. In other embodiments, the media 106 may have internal structure, e.g., a plurality of stacked layers.

As shown in FIG. 1, the carbonaceous energy storage media comprises a contact layer 106a that may include carbon nanotubes. The contact layer 106a is in contact with the elongated metal carbide nanostructures 104 extending from the first surface 103.

In some embodiments, the contact layer 106a may include a compressed layer of carbon nanotubes. For example, in some embodiments, the nanotubes (e.g., vertically aligned nanotubes) may be grown on a carrier substrate (not shown) and transferred onto the surface 103 using any suitable technique. Exemplary transfer techniques are disclosed in PCT Publication No. WO/2012/170749 published Dec. 13, 2012, and in U.S. patent Publication No. 2013/0044405 published Feb. 21, 2013 and titled "High Power and High Energy Electrodes Using Carbon Nanotubes," the entire contents of each of which are incorporated herein by reference. In some embodiments, pressure may be applied during the transfer process to compress the nanotubes. The compressed nanotubes may include physical defects, such as windows and cracks, generally provide more surface area for charge storage, while occupying a smaller volume than the uncompressed material.

In some embodiments, the nanotubes may be aligned in a direction transverse to the first surface 103 (e.g., substantially perpendicular to the surface). In some embodiments, the nanotubes may be aligned in a direction substantially parallel to the first surface 103. In still further embodiments, the nanotubes may be unaligned or in a combination of various configurations.

In some embodiments, the contact layer 106a comprises an aggregate of carbonaceous materials, e.g., including carbon nanotubes. In some embodiments, the aggregate may consist essentially of carbon nanotubes. In some embodiments, the aggregate may include carbon nanotubes mixed with a different form of carbonaceous material such as activated carbon or another nanoform carbon material. For example, in some embodiments, the carbon nanotubes may make up less than 90%, 80%, 70%, 60%, 50%, 40%, 30%, 10%, 5%, 2.5%, 1%, or less of the aggregate by weight. In some embodiments, the aggregate may be a dried aggregate, e.g., substantially free of any liquid such as solvents or moisture.

The aggregate may be formed using any suitable technique, such as those described in PCT Publication No. WO/2012/170749. For example, in some embodiments the aggregate may be formed as follows. A first solution (also referred to herein as a slurry) is provided that includes a solvent and a dispersion of carbon nanotubes, e.g., vertically aligned carbon nanotubes. A second solution (also referred to herein as a slurry) may be provided that includes a solvent with carbon disposed therein. The carbon addition includes at least one form of material that is substantially composed of carbon. Exemplary forms of the carbon addition include, for example, at least one of activated carbon, carbon powder, carbon fibers, rayon, graphene, aerogel, nanohorns, carbon nanotubes and the like. While in some embodiments, the carbon addition is formed substantially of carbon, it is recognized that the carbon addition may include at least some impurities, e.g., by design.

Generally, the one or more of the solvents used may be an anhydrous solvent, although this is not a requirement. For example, the solvent may include at least one of ethanol, methanol, DMSO, DMF, acetone, acetonitrile, and the like. Generally, the dispersion of vertically aligned carbon nanotubes may include fragments of vertically aligned carbon nanotubes produced by a production cycle. That is, the vertically aligned carbon nanotubes may be segmented into fragments when harvested from a substrate.

The two solutions may subjected to "sonication" (physical effects realized in an ultrasonic field). With regard to the first solution, the sonication is generally conducted for a period that is adequate to tease out, fluff or otherwise parse the carbon nanotubes. With regard to the second solution, the sonication is generally conducted for a period that is adequate to ensure good dispersion or mixing of the carbon additions within the solvent.

Once the first solution and the second solution have been adequately sonicated, they are then mixed together, to provide a combined solution and may again be sonicated. Generally, the mixture is sonicated for a period that is adequate to ensure good mixing of the vertically aligned carbon nanotube with the carbon addition. This second mixing results in a carbonaceous aggregate.

The carbonaceous aggregate may then be withdrawn from the combined solution and processed. For example, the wet carbonaceous aggregate may be placed onto an appropriate surface. While any material deemed appropriate may be used for the surface, exemplary material includes PTFE as subsequent removal from the surface is facilitated by the properties thereof.

In some embodiments, the carbonaceous aggregate is formed in a press to provide a layer that exhibits a desired thickness, area and density.

In some embodiments, the aggregate may be cast wet directly onto the surface 103a, and dried (e.g., by applying heat or vacuum or both) until substantially all of the solvent and any other liquids have been removed, thereby forming the contact layer 106a. In some such embodiments it may be desirable to protect various parts of the current collector 101 (e.g., and underside where the current collector is intended for two sided operation) from the solvent, e.g., by masking certain areas, or providing a drain to direct the solvent.

In other embodiments, the aggregate may be dried elsewhere and then transferred onto the surface 103 to form the contact layer 106a, using any suitable technique (e.g., roll-to-roll layer application).

In some embodiments the media 106 includes a first overlayer 106b of carbonaceous material disposed on the contact layer 106a. In some embodiment, the first overlayer 106b has a thickness in a direction perpendicular the first surface 103 that is greater than a thickness of the contact layer 106a along the same dimension (as shown, the vertical direction). In some embodiments, the first overlayer 106b has a thickness in a direction perpendicular the first surface of in the range of about 1 µm to about 1,000 µm, or any subrange thereof, such as 10-100 µm.

In some embodiments, the overlayer 106b may include a compressed layer of carbon nanotubes. For example, in some embodiments, the nanotubes (e.g., vertically aligned nanotubes) may be grown on a carrier substrate (not shown) and transferred onto the contact layer 106a using any suitable technique. Exemplary transfer techniques are disclosed in PCT Publication No. WO/2012/170749 published Dec. 13, 2012, and in U.S. patent Publication No. 2013/0044405 published Feb. 21, 2013 and titled "High Power and High Energy Electrodes Using Carbon Nanotubes," the entire contents of each of which are incorporated herein be reference. In some embodiments, pressure may be applied during the transfer process to compress the nanotubes. The compressed nanotubes may include physical defects, such as windows and cracks, generally provide more surface area for charge storage, while In some embodiments, the nanotubes may be aligned in a direction transverse to the first surface 103 (e.g., substantially perpendicular to the surface). In some embodiments, the nanotubes may be aligned in a direction substantially parallel to the first surface 103. In still further embodiments, the nanotubes may be unaligned or in a combination of various configurations.

In some embodiments, the overlayer 106b comprises an aggregate of carbonaceous materials, e.g., including carbon nanotubes. In some embodiments, the aggregate may consist essentially of carbon nanotubes. In some embodiments, the aggregate may include carbon nanotubes mixed with a different form of carbonaceous material such as activated carbon or another nanoform carbon material. For example, in some embodiments, the carbon nanotubes may make up less than 90%, 80%, 70%, 60%, 50%, 40%, 30%, 10%, 5%, 2.5%, 1%, or less of the aggregate by weight. In some embodiments, the aggregate may be a dried aggregate, e.g., substantially free of any liquid such as solvents or moisture.

The aggregate may be formed using any suitable technique, such as those described in PCT Publication No. WO/2012/170749. The aggregate may wet cast onto the contact layer 106a, or cast and dried to form the overlay 106b. The aggregate may be formed as a dry layer transferred onto the contact layer 106a.

In some embodiments, the overlayer 106b may be in direct physical contact with contact layer 106a, e.g., such that no adhesion or bonding layer is disposed therebetween. For example, in some embodiments, the contact layer 106a and the overlayer 106b adhere to each other through Van der Waals bonding between carbonaceous material in each layer.

In various embodiments, one more additional overlayers (not shown), comprising carbonaceous material may be stacked over the first overlayer 106b, e.g., by repeating any of the techniques described above with respect to applying the first overlayer 106b.

In some embodiments, the electrode 100 may be a two sided electrode, wherein the current collector comprises a second surface, e.g., a lower surface, having a similar structure and energy storage media disposed thereon.

Figure 2A:
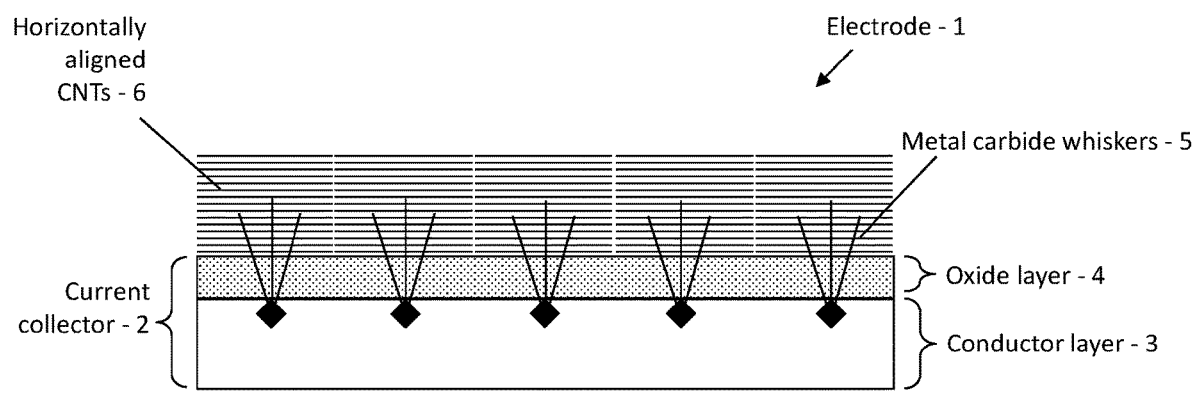
FIG. 2A is a block diagram depicting an embodiment of the electrode of the present disclosure.

In various embodiments, the presently disclosed electrodes comprise a current collector having a metal carbide layer on at least one surface and CNTs disposed on the metal carbide layer. FIGS. 2A-2D depict various electrodes 1 according to the present disclosure. FIG. 2A depicts certain embodiments in which the electrode comprises horizontally aligned CNTs 6 disposed on a layer of metal carbide whiskers 5 on a surface of a current collector 2. Current collector 2 may comprise a conducting layer 3 and an oxide layer 4. Conducting layer 3 may be selected from any material with acceptable electrical and mechanical properties for a particular application, such as conductivity, stability, electrochemical reactivity, hardness, tear resistance, and processability. Conducting layer 3 is typically selected from a variety of conducting metals, such as aluminum, or metal alloys. Oxide layer 4 may be present or absent, but is typically present when conducting layer 4 comprises as oxidizable metal such as aluminum. Metal carbide whiskers 5 are generally a nanostructured metal carbide that are connected to conductor layer 3 of current collector 2 and, when oxide layer 4 is present, extend through oxide layer 4. CNTs, which are shown as horizontally aligned CNTs 6 in FIG. 2A, adhere to metal carbide whiskers 5, e.g., through Van der Waals forces. Metal carbide whiskers 5 provide for improved electrical contact between the CNTs and conducting layer 3, enabling a reduction in the intrinsic resistance of the electrode, while maintaining good adhesion between the current collector 2 and the CNTs 6, when compared to an electrode having an analogous current collector without metal carbide whiskers.

Figure 2B:
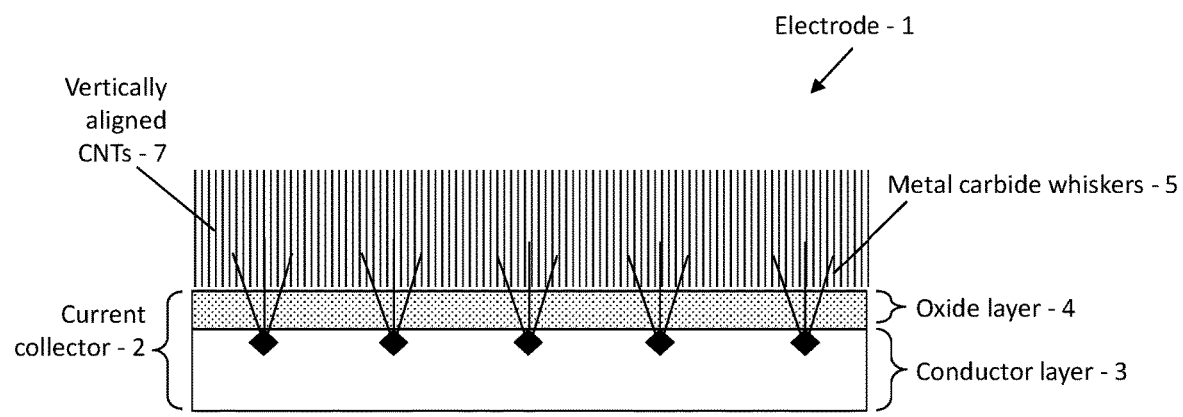
FIG. 2B is a block diagram depicting an embodiment of the electrode of the present disclosure.
Figure 2C:
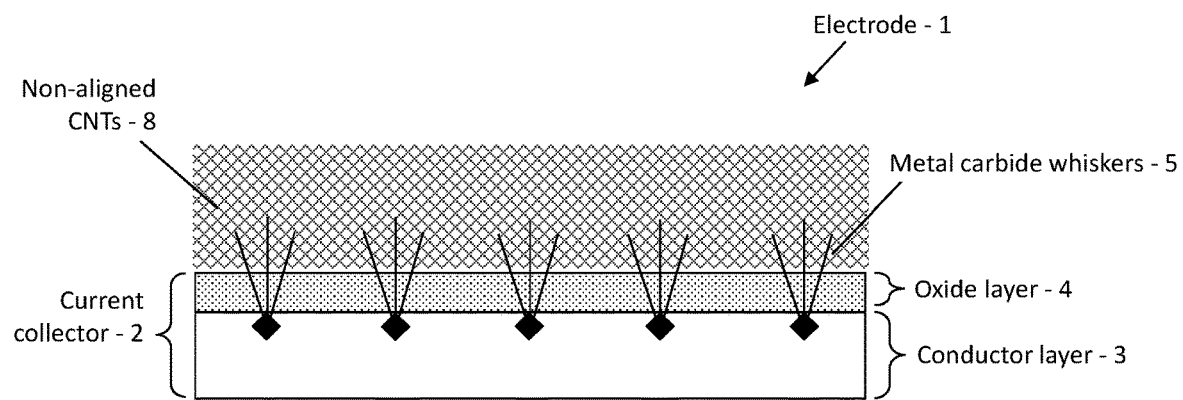
FIG. 2C is a block diagram depicting an embodiment of the electrode of the present disclosure.
Figure 2D:
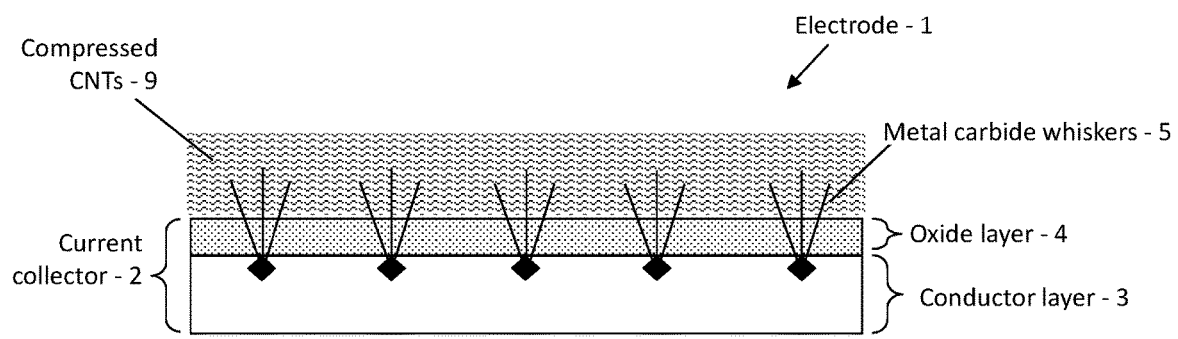
FIG. 2D is a block diagram depicting an embodiment of the electrode of the present disclosure.

FIG. 2B depicts certain embodiments in which the electrode comprises vertically aligned CNTs 7. FIG. 2C depicts certain embodiments in which the electrode comprises non-aligned CNTs 8, such as tangled or clustered CNTs. FIG. 2D depicts certain embodiments in which the electrode comprises compressed CNTs 9, which may be horizontally aligned CNTs or vertically aligned CNTs that are compressed before or after disposing them onto current collector 2. Generally, compressed CNTs have a higher specific surface area ($m^2/g$) than the corresponding uncompressed CNTs. U.S. patent Publication No. 2013/0044405 published Feb. 21, 2013 and titled "High Power and High Energy Electrodes Using Carbon Nanotubes," the entire disclosure of which is incorporated herein by reference, discloses compressed CNTs and methods of fabricating electrodes comprising compressed CNTs that may be employed to construct electrodes according to the present disclosure. Specifically, paragraphs [0028] to [0038] and U.S. patent Publication No. 2013/0044405 and the related figures describe, among other things, electrodes comprising compressed CNTs and methods of fabricating such electrodes.

In certain embodiments, the current collector comprises aluminum carbide whiskers (analogous to metal carbide whiskers 5) on an aluminum current collector (analogous to current collector 2) having a conducting layer of aluminum (analogous to conducting layer 3) and a layer of aluminum oxide (analogous to oxide layer 4). An exemplary current collector is the current collector available from Toyo Aluminum K.K. under the trade name TOYAL-CARBO®. The aluminum carbide "whiskers" are typically <50 nm, <30 nm, or about 20-30 nm in diameter.

As used herein, the term "ultracapacitor" should be given its ordinary and customary meaning to those skilled in the art and refers, without limitation, to an energy storage device also known as a "supercapacitor" and sometimes as an "electric double layer capacitor."

Ultracapacitors are disclosed herein, which employ the electrodes disclosed herein. The ultracapacitors disclosed herein are exemplary energy storage devices in which the electrodes disclosed herein may be employed. Other energy storage devices, including electrolytic capacitors and rechargeable batteries, that comprise the electrodes disclosed herein are also contemplated by this disclosure, and can be constructed by adapting existing fabrication methods.

In certain embodiments, an ultracapacitor may be formed comprising an electrode of the type described herein. The ultracapacitor may further comprise an electrolyte with certain desired properties in terms of the electrical performance and compatibility with the other materials of the ultracapacitor, e.g., the electrode or separator. In certain embodiments, the electrolyte is a solution comprising at least one inorganic or organic salt, such as an ionic liquid, and optionally further comprising at least one solvent. In certain embodiments, the electrolyte is a gel comprising at least one ionic liquid and at least one gelling agent, and optionally comprising other additives such as solvents, salts, and surfactants. In certain embodiments, the electrolyte is a solid polymer electrolyte comprising at least one inorganic or organic salt, such as an ionic liquid, and at least one polymeric material, such as a fluoropolymer (e.g., polytetrafluoroethylene (PTFE), polyether ether ketone (PEEK), polyvinylidene difluoride (PVDF), or co-polymers thereof) and optionally comprising other additives such as solvents, salts, and surfactants. In a particular embodiment, the electrolyte is substantially free of moisture and other contaminants that may adversely affect the performance of the ultracapacitor.

The ultracapacitor may further comprise a separator to provide electrical separation between a positive electrode and a negative electrode of the ultracapacitor, which separator has certain desired properties in terms of the electrical performance and compatibility with the other materials of the ultracapacitor, e.g., the electrode or electrolyte. In certain embodiments, the separator comprises a material selected from the group consisting of polyamide, PTFE, PEEK, PVDF, aluminum oxide ($Al_2O_3$), fiberglass, fiberglass reinforced plastic, or any combination thereof. In a particular embodiment, the separator is substantially free of moisture. In another particular embodiment, the separator is substantially hydrophobic. In some embodiments, (e.g., where a solid state electrolyte use used that may operate to separate the electrodes of the device), a separator may be omitted.

Figure 6:
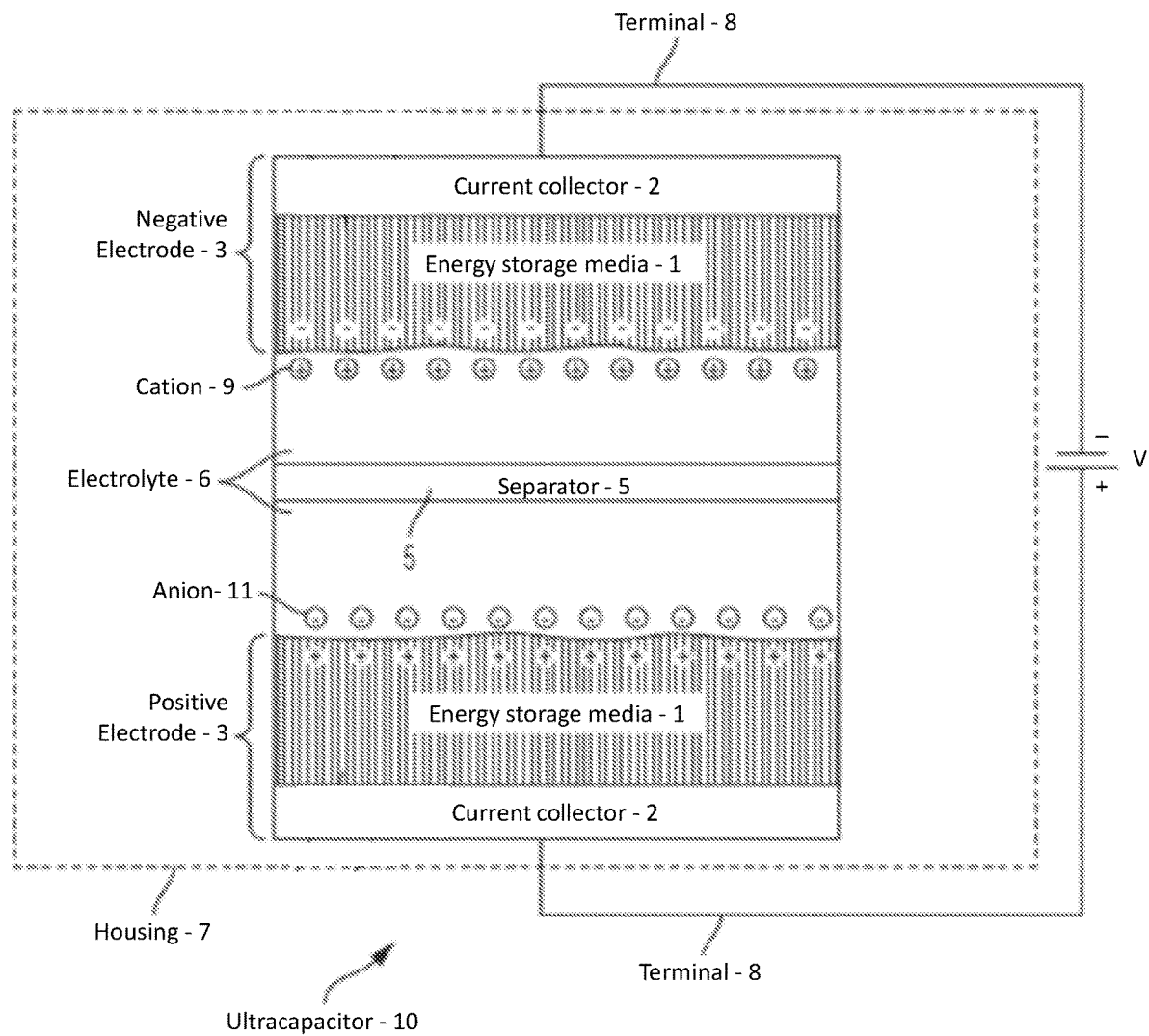
FIG. 6 is a block diagrams depicting an embodiment of an ultracapacitor of the present disclosure.

FIG. 6 shows an exemplary implementation of an ultracapacitor 10 (note, for FIG. 6 like reference numerals do not indicate correspondence to equivalent elements in other figures). In this case, the ultracapacitor 10 is an electric double-layer capacitor (EDLC). The EDLC includes at least one electrode 3, e.g., of the types described in detail above (in some cases, such as where there are two electrodes 3, the electrodes may be referred to as a negative electrode 3 and a positive electrode 3). When assembled into the ultracapacitor 10, each electrode 3 presents a double layer of charge at an electrolyte interface. In some embodiments, a plurality of electrodes 3 is included. However, for purposes of discussion, only two electrodes 3 are shown. As a matter of convention herein, at least one of the electrodes 3 uses a carbon-based energy storage media 1 (as discussed further herein) to provide energy storage.

Each of the electrodes 3 includes a respective current collector 2 (also referred to as a "charge collector"). The electrodes 3 are separated by a separator 5. In general, the separator 5 is a thin structural material (usually a sheet) used to separate the electrodes 3 into two or more compartments.

At least one form of electrolyte 6 is included, and fills void spaces in and between the electrodes 3 and the separator 5. In general, the electrolyte 6 is a substance that disassociates into electrically charged ions. A solvent that dissolves the substance may be included in some embodiments. A resulting electrolytic solution conducts electricity by ionic transport.

Generally, a combination of the electrode(s) 3 and the separator 5 are then formed into one of a wound form or prismatic form which is then packaged into a cylindrical or prismatic housing 7. Once the electrolyte 6 has been included, the housing 7 is hermetically sealed. In various examples, the package is hermetically sealed by techniques making use of laser, ultrasonic, and/or welding technologies. The housing 7 (also referred to as a "enclosing body" or "case" or by other similar terms) includes at least one terminal 8. Each terminal 8 provides electrical access to energy stored in the energy storage media 1, generally through electrical leads (not shown) which are coupled to the energy storage media 1.

That is, in some embodiments, a plurality of leads (not shown) are electrically coupled to each of the current collectors 2. Each plurality (accordingly to a polarity of the ultracapacitor 10) are grouped and coupled to respective terminals 8 of the housing 7.

Additional exemplary suitable implementations of ultracapacitors that may include electrodes of the type described in the present disclosure are disclosed in PCT Publication Number WO/2015/102716 published Jul. 9, 2015, and entitled "ADVANCED ELECTROLYTES FOR HIGH TEMPERATURE ENERGY STORAGE DEVICE," the entire contents of which are incorporated herein by reference.

Figure 3:
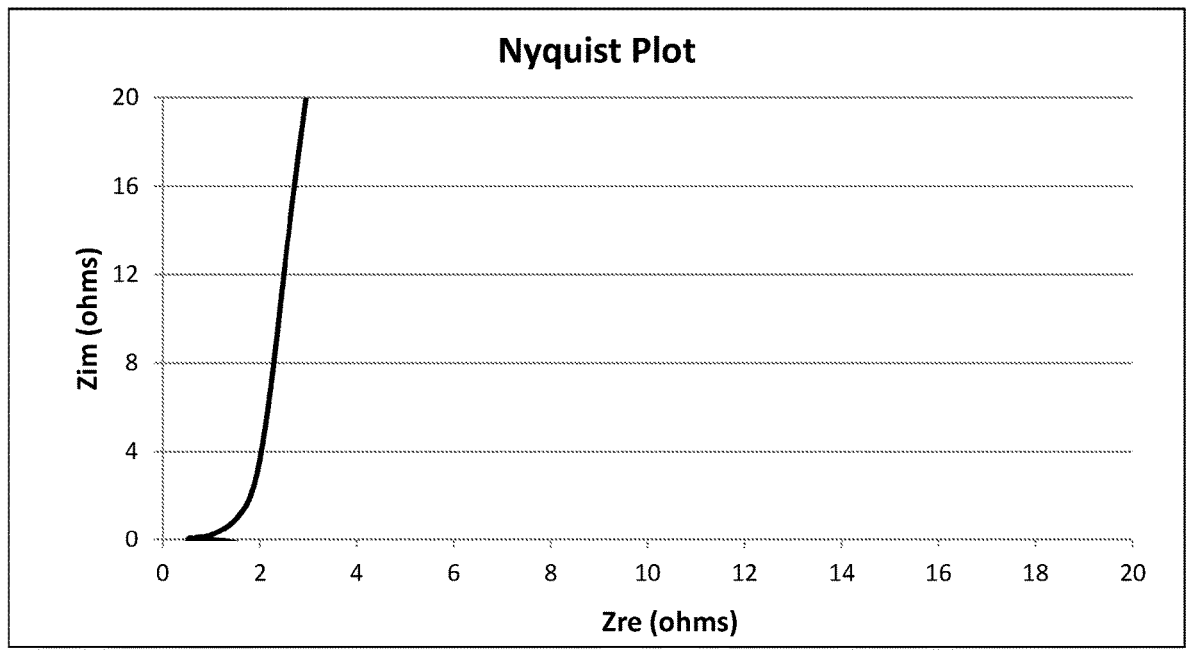
FIG. 3 is a Nyquist plot for an ultracapacitor of the present disclosure.

FIGS. 3 to 5C show experimental results for exemplary ultracapacitors of the type described here. FIG. 3 shows a conventional Nyquist plot for an ultracapacitor of the type described herein showing excellent performance.

Figure 4A:
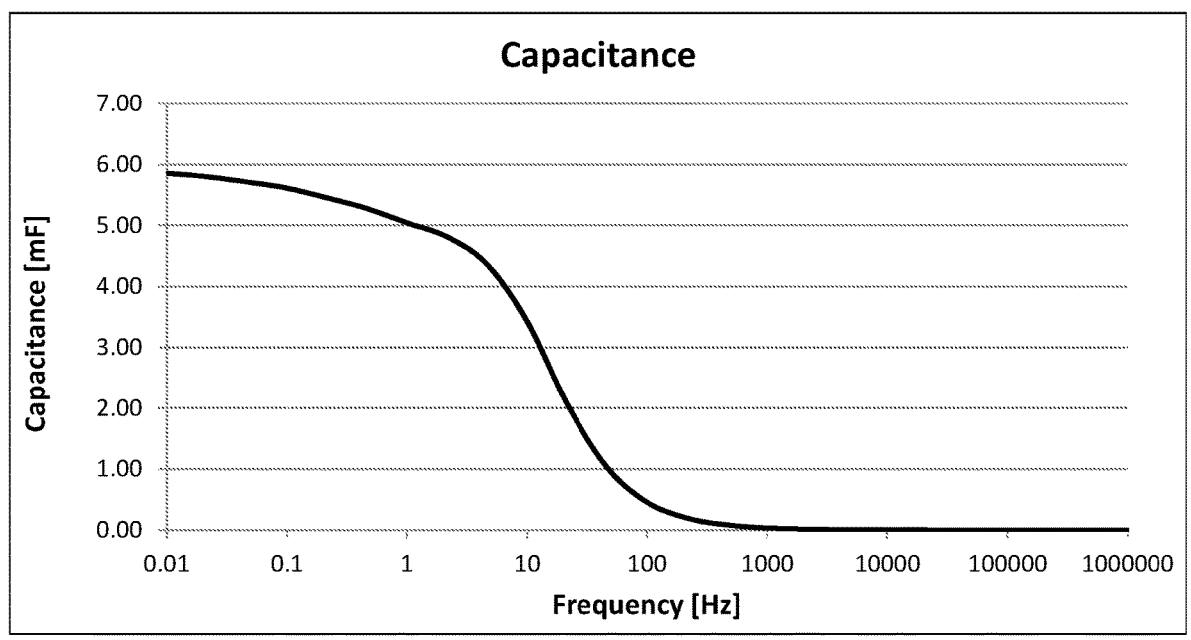
FIG. 4A is a capacitance versus frequency plot for an ultracapacitor of the present disclosure.
Figure 4B:
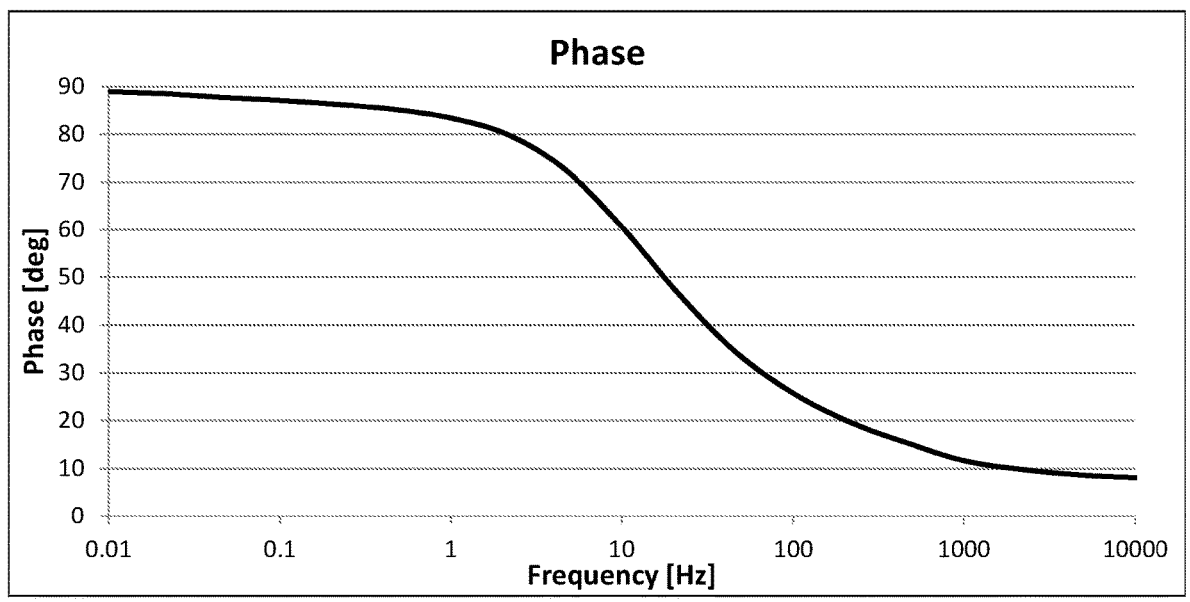
FIG. 4B is a phase versus frequency plot for an ultracapacitor of the present disclosure.
Figure 4C:
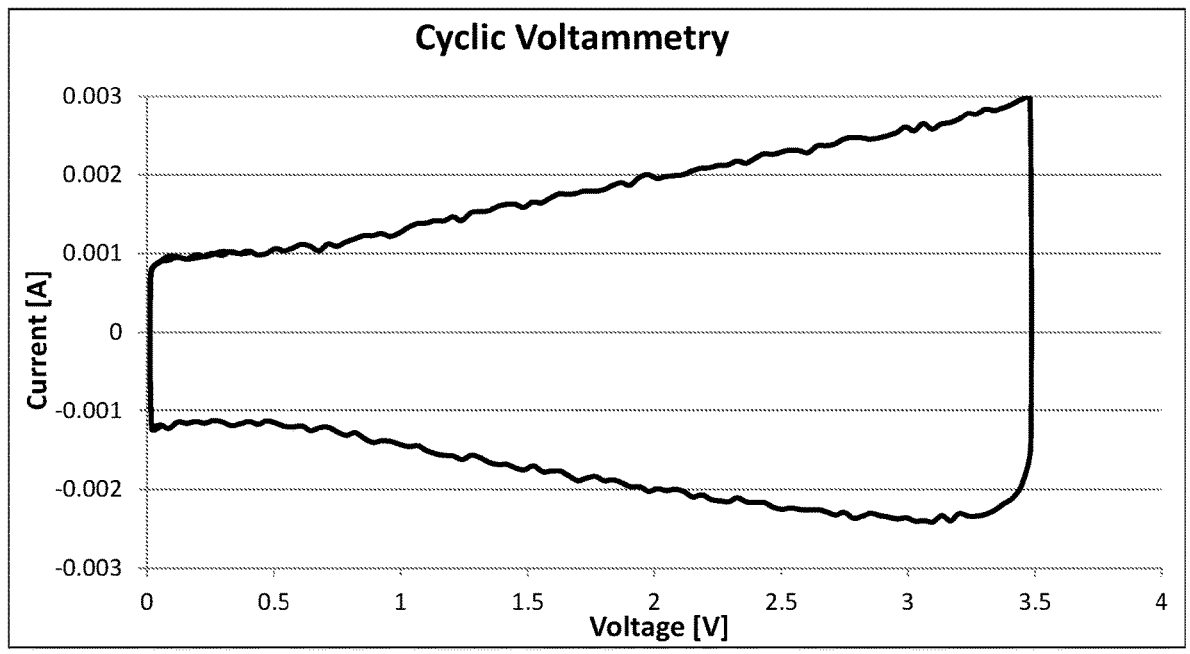
FIG. 4C is a cyclic voltammetry plot for an ultracapacitor of the present disclosure.

FIG. 4A and FIG. 4B are, respectively, plots of capacitance and phase versus frequency for an ultracapacitor of the type described herein having an electrode featuring an electrode comprising a 50 μm aluminum foil with aluminum carbide whiskers and a carbon nanotubes layer disposed thereon. The ultracapacitor shows good capacitive behavior up to a cutoff frequency of about 10 Hz. FIG. 4C shows cyclic voltammetry results for the same ultracapacitor, showing a good operation voltage window ranging from 0V to more than 3V.

Figure 5A:
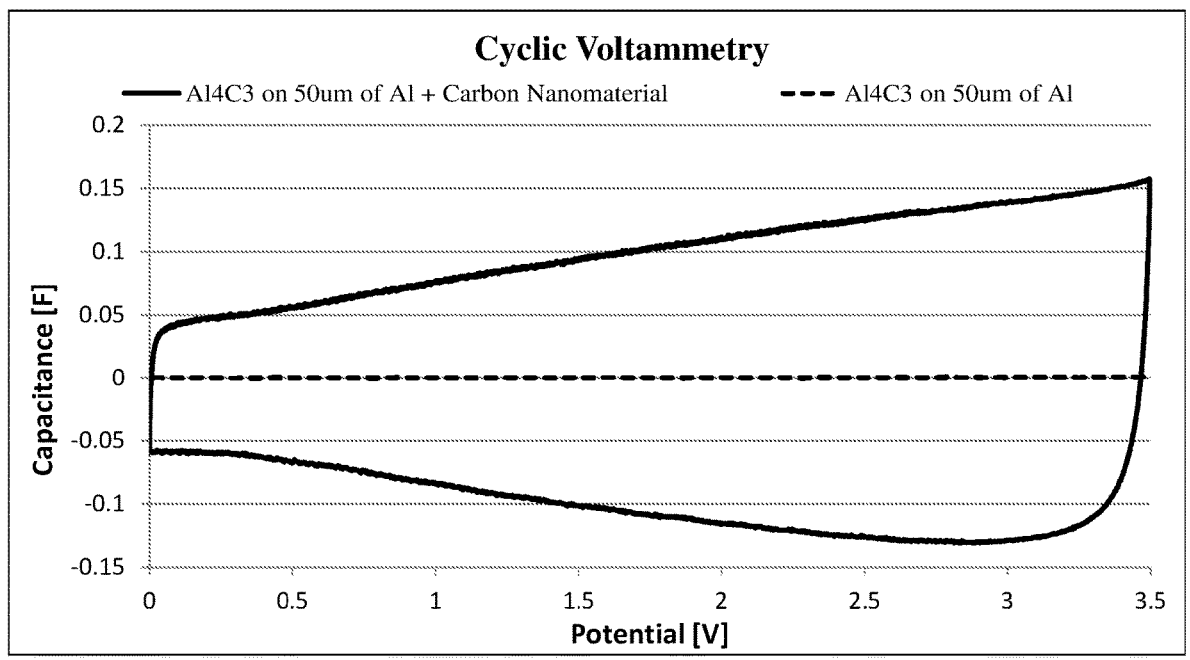
FIG. 5A is a cyclic voltammetry plot for an ultracapacitor of the present disclosure with and without carbon nanotubes.
Figure 5B:
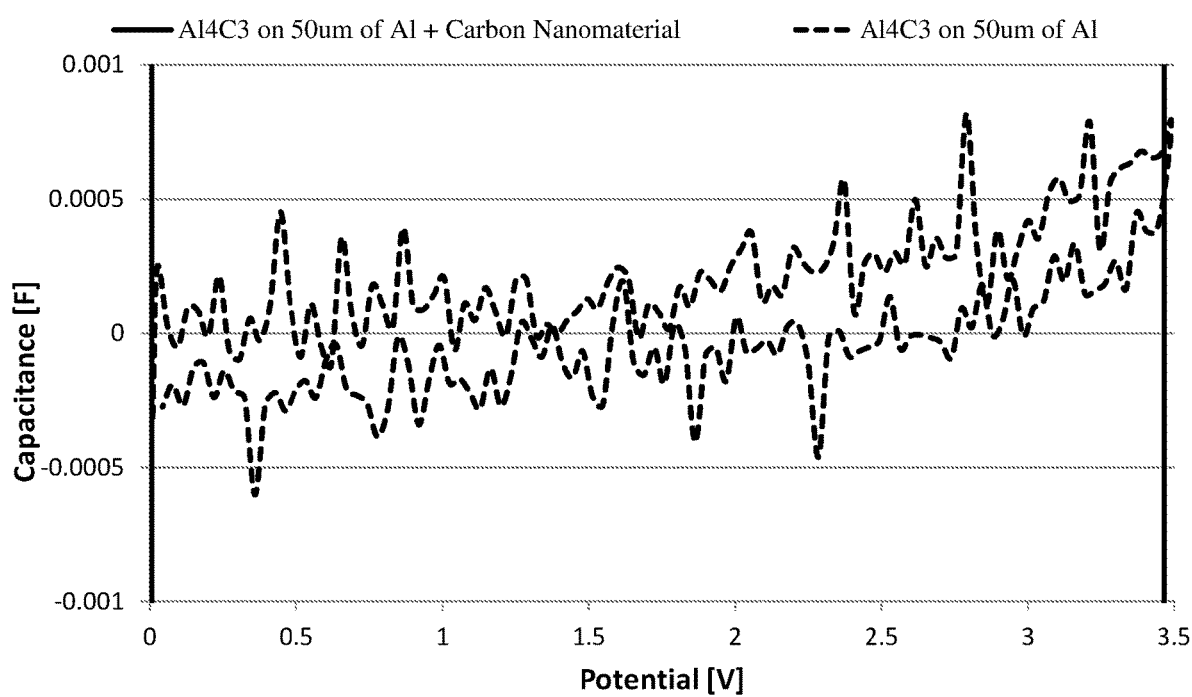
FIG. 5B is a detailed view of a portion of the plot of FIG. 5A.
Figure 5C:
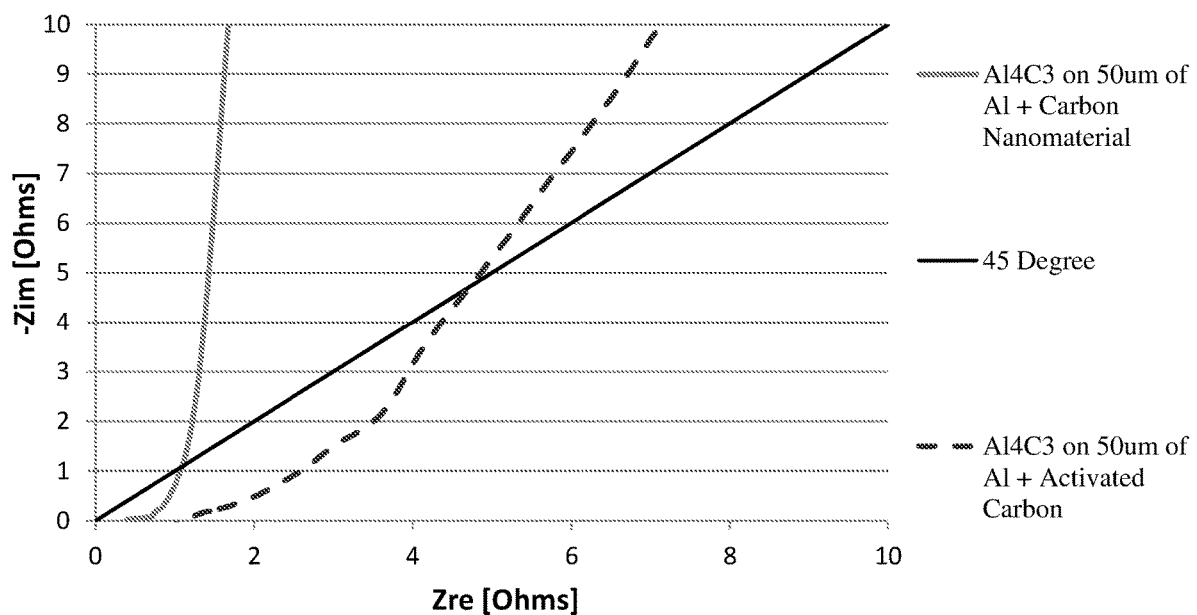
FIG. 5C is a Nyquist plot for an ultracapacitor of the present disclosure with and without carbon nanotubes.

FIGS. 5A, 5B, and 5C show a performance comparison for ultracapacitors of the type described herein having an electrode featuring either an electrode comprising a 50 μm aluminum foil with aluminum carbide whiskers and a carbon nanotubes layer disposed thereon or a similar electrode without any carbon nanotubes. As will be apparent to one skilled in the art, the nanotube-based electrode shows substantially better performance than the electrode lacking nanotubes.

Having disclosed aspects of embodiments of the production apparatus and techniques for fabricating aggregates of carbon nanotubes, it should be recognized that a variety of embodiments may be realized. Further a variety of techniques of fabrication may be practiced. For example, steps of fabrication may be adjusted, as well as techniques for joining, materials and chemicals used and the like.

As a matter of convention, it should be considered that the terms "may" as used herein is to be construed as optional; "includes," "has" and "having" are to be construed as not excluding other options (i.e., steps, materials, components, compositions, etc., . . . ); "should" does not imply a requirement, rather merely an occasional or situational preference. Other similar terminology is likewise used in a generally conventional manner.

While the invention has been described with reference to exemplary embodiments, it will be understood that various changes may be made and equivalents may be substituted for elements thereof without departing from the scope of the invention. For example, in some embodiments, one of the foregoing layers may include a plurality of layers there within. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrode comprising:
a current collector comprising:
a conductor layer having at least a first surface; where the conductor layer comprises aluminum;
a metal carbide layer disposed on the first surface;
a metal oxide layer disposed on the metal carbide layer;
elongated metal carbide nanostructures extending from the first surface; and
a carbonaceous energy storage media disposed on the metal oxide layer and in contact with the elongated metal carbide nanostructures; wherein the carbonaceous energy storage media is present in the form of a contact layer and an over layer; and wherein the contact layer comprises carbon nanotubes and activated carbon.

2. The electrode of claim 1, wherein the over layer is disposed on the contact layer.

3. The electrode of claim 2, wherein the over layer comprises carbon nanotubes.

4. The electrode of claim 2, wherein the carbon nanotubes are compressed.

5. The electrode of claim 1, wherein the carbon nanotubes are compressed.

6. The electrode of claim 1, wherein the carbon nanotubes are present in the form of carbon nanotube aggregates.

7. The electrode of claim 1, wherein the elongated metal carbide nanostructures extend through the contact layer.

8. The electrode of claim 1, wherein the elongated metal carbide nanostructures comprise magnesium carbide, aluminum carbide, titanium carbide, zirconium carbide, hafnium carbide, vanadium carbide, niobium carbide, tantalum carbide, chromium carbide, molybdenum carbide, tungsten carbide, or a mixed metal carbide.

9. The electrode of claim 8, wherein the mixed metal carbide comprises a titanium-tantalum carbide, an aluminum-titanium carbide, or a nickel-silicon carbide.

10. The electrode of claim 1, wherein the contact layer has a thickness in a direction perpendicular the first surface of less than about 5 μm.

11. The electrode of claim 1, wherein the contact layer has a thickness in a direction perpendicular the first surface of less than about 10 μm.

12. The electrode of claim 1, wherein the over layer has a thickness in a direction perpendicular the first surface of in a range of about 10 μm to about 1,000 μm.

13. The electrode of claim 1, wherein the over layer comprises vertically aligned carbon nanotubes.

14. The electrode of claim 2, wherein the over layer comprises vertically aligned carbon nanotubes.

15. The electrode of claim 1, wherein no adhesion or bonding layer is disposed between the contact layer and the overlayer and wherein the contact layer and the over layer adhere through Van der Waals bonding between carbonaceous material in each layer.

16. The electrode of claim 1, wherein the elongated metal carbide nanostructures comprise nanorods each having a radial thickness of less than 50 nm and a longitudinal length of greater than 500 nm.

17. An energy storage device comprising:
at least one electrode comprising:
a current collector comprising:
a conductor layer having at least a first surface; where the conductor layer comprises aluminum;
a metal carbide layer disposed on the first surface;
a metal oxide layer disposed on the metal carbide layer;
elongated metal carbide nanostructures extending from the first surface; and
a carbonaceous energy storage media disposed on the metal oxide layer and in contact with the elongated metal carbide nanostructures; wherein the carbonaceous energy storage media is present in the form of a contact layer and an over layer; and wherein the contact layer comprises carbon nanotubes and activated carbon.

* * * * *